(12) United States Patent
Hulme et al.

(10) Patent No.: US 9,862,860 B2
(45) Date of Patent: Jan. 9, 2018

(54) NON-SILICONE ADDITIVES IN RELEASE COATING MATERIALS

(71) Applicant: Avery Dennison Corporation, Glendale, CA (US)

(72) Inventors: Adrian J. Hulme, Mentor, OH (US); Shubhangi Hemant Nair, Maharashahtra (IN)

(73) Assignee: Avery Dennison Corporation, Glendale, CA (US)

( * ) Notice: Subject to any disclaimer, the term of this patent is extended or adjusted under 35 U.S.C. 154(b) by 0 days.

(21) Appl. No.: 15/141,965

(22) Filed: Apr. 29, 2016

(65) Prior Publication Data

US 2016/0319157 A1 Nov. 3, 2016

(30) Foreign Application Priority Data

Apr. 29, 2015 (IN) .......................... 1701/MUM/2015

(51) Int. Cl.
| | |
|---|---|
| *C09D 183/04* | (2006.01) |
| *C08K 3/34* | (2006.01) |
| *C09J 7/02* | (2006.01) |
| *C08L 83/04* | (2006.01) |
| *C08G 77/12* | (2006.01) |
| *C08G 77/20* | (2006.01) |

(52) U.S. Cl.
CPC .............. *C09D 183/04* (2013.01); *C08K 3/34* (2013.01); *C08L 83/04* (2013.01); *C09J 7/0228* (2013.01); *C09J 7/0235* (2013.01); *C08G 77/12* (2013.01); *C08G 77/20* (2013.01); *C09J 2483/005* (2013.01)

(58) Field of Classification Search
CPC ....... C08G 77/12; C08G 77/20; C09D 183/04
See application file for complete search history.

(56) References Cited

U.S. PATENT DOCUMENTS

| | | | |
|---|---|---|---|
| 4,618,657 A | 10/1986 | Katchko et al. | |
| 5,192,612 A | 3/1993 | Otter et al. | |
| 5,346,766 A | 9/1994 | Otter et al. | |
| 5,425,991 A | 6/1995 | Lu | |
| 5,858,545 A * | 1/1999 | Everaerts | ............ C08F 290/148 |
| | | | 428/447 |
| 2007/0054080 A1* | 3/2007 | Hulteen | ................... C09J 7/046 |
| | | | 428/40.1 |

FOREIGN PATENT DOCUMENTS

| | | |
|---|---|---|
| EP | 0379561 | 8/1990 |
| EP | 0920986 | 6/1999 |
| EP | 1276825 | 9/2004 |

OTHER PUBLICATIONS

International Search Report and Written Opinion dated Sep. 7, 2016 issued in corresponding International Application No. PCT/US2016/029948 filed Apr. 29, 2016.

* cited by examiner

*Primary Examiner* — Kuo-Liang Peng
(74) *Attorney, Agent, or Firm* — Avery Dennison Corporation (57) ABSTRACT

Release coating formulations are described which include one or more non-silicone additives. The formulations achieve reduction in release coating cost by replacing silicone base polymer in a release coating system without detrimental effects on release performance. The release coating formulations include one or more non-silicone additive(s) and silicone base polymer. The non-silicone additive can include stearyl methacrylate. Also described are release liners, adhesive articles, and methods utilizing the release coating formulations.

37 Claims, 1 Drawing Sheet

NON-SILICONE ADDITIVES IN RELEASE COATING MATERIALS

CROSS REFERENCES TO RELATED APPLICATION

The present application claims the benefit of Indian Provisional Application No. 1701/MUM/2015 filed on Apr. 29, 2015, which is incorporated herein by reference in its entirety.

FIELD

The present subject matter relates to release coating compositions for liners such as used in pressure sensitive adhesive applications. More particularly, the subject matter relates to addition of one or more non-silicone additive(s) to a silicone formulation in release coating applications. The additive is an acrylate and participates in hydrosilylation reaction(s). The additive serves as an accelerator for hydrosilylation reactions and can reduce the concentration of platinum catalyst typically used in release coating compositions. The additive(s) and compositions containing such enable the use of reduced silicone coat weights as compared to currently known release coatings. The present subject matter also relates to release liners and adhesive articles utilizing the additives, the release coating materials, and related methods.

BACKGROUND

Silicone has gained major attention in the pressure sensitive adhesive industry as a release coating due to its unique surface properties and viscoelastic characteristics. However, owing to the cost associated with silicone, industries also seek cost-effective alternatives to silicone. Traditional methods of reducing the cost of a release coating have focused on lowering of silicone coat weight and/or lowering of platinum catalyst content which is used as an additional curing system in silicone release coatings. An extra amount of platinum catalyst is generally used in silicone release coating formulations as the platinum catalyst can become deactivated. However, platinum is relatively expensive and therefore the total cost of a release coating formulation can significantly increase due to high amounts of platinum. Nevertheless, decreasing concentration of platinum in such formulations has proved challenging in the past. Low amounts of platinum can negatively affect the curing speed and release properties due to incomplete curing.

Therefore, in view of the foregoing, a need exists particularly in the pressure sensitive label application field, for a cost effective release coating formulation.

SUMMARY

The difficulties and drawbacks associated with previous approaches are addressed in the present subject matter as follows.

In one aspect, the present subject matter provides a release coating material comprising at least one silicone base polymer, and at least one non-silicone additive.

In another aspect, the present subject matter provides a flexible liner defining a first face and an oppositely directed second face. The release liner also comprises a release coating material disposed on at least a portion of the first face of the liner. The release coating material includes at least one silicone base polymer and at least one non-silicone additive.

In still another aspect, the present subject matter provides method of reducing cost of a release coating material including at least one silicone base polymer. The method comprises replacing a portion of the amount of silicone base polymer in the release coating material with at least one non-silicone additive.

In yet another aspect, the present subject matter provides an adhesive article comprising a substrate, adhesive disposed on the substrate, and a release liner having a release coating material disposed on at least a portion of the liner. The release coating material of the liner is disposed on the adhesive. The release coating material includes at least one silicone base polymer and at least one non-silicone additive.

As will be realized, the subject matter described herein is capable of other and different embodiments and its several details are capable of modifications in various respects, all without departing from the claimed subject matter. Accordingly, the drawings and description are to be regarded as illustrative and not restrictive.

DETAILED DESCRIPTION OF THE EMBODIMENTS

One of the objects of the present subject matter is to provide a silicone system with non-silicone additive(s) as a release coating material for liners in pressure sensitive adhesive applications.

Another object of the present subject matter is to provide a silicone system in a solventless, a solvent based, and/or an emulsion based release coating material.

Another object of the present subject matter is to provide a release coating material which allows easy delamination or easy label transfer from a liner onto an object to be labeled.

Another object of the present subject matter is to provide a release coating material which is comparatively less expensive than what is currently known in the art.

Another object of the present subject matter is to provide a method of preparation of the release coating material.

Another object of the present subject matter is to introduce one or more non-silicone additive(s) in a solventless silicone system which is crosslinked without detrimental effects on release performance.

Another object of the present subject matter is to provide a release coating formulation with one or more non-silicone additive(s) which provides desired rheological characteristics.

Another object of the present subject matter is to provide a release coating formulation with one or more non-silicone additive(s) which provides desired anchorage characteristics.

Another object of the present subject matter is to provide a release coating formulation which can be adapted to different converting, printing and die cutting operations and which can be used in association with a wide array of substrates.

Various embodiments and features or advantageous details are explained with reference to non-limiting embodiments that are illustrated or described in the description. Description of well known components and processing techniques are omitted so as to not unnecessarily obscure the embodiments described herein. The examples provided herein are intended merely to facilitate an understanding of ways in which the embodiments herein may be practiced or utilized. The description should not be construed as limiting the scope of the embodiments herein.

The present subject matter is aimed at providing and formulating a non-silicone component to achieve a cost reduction in a release coating by replacing silicone base polymer in release coating systems without detrimental effects on release performance.

Release Coating Materials

Generally, the release coating material or formulation of the present subject matter comprises one or more silicone base polymer(s), one or more non-silicone additives, and one or more crosslinking agents or "crosslinkers." The release coating material may additionally comprise one or more catalyst(s) as described herein.

The silicone base polymer is generally a vinyl functional polydimethylsiloxane (PDMS) and particularly vinyl terminated. In certain embodiments, the silicone base polymer is a vinyl terminated PDMS. A wide array of PDMS and PDMS derivatives can be used for the silicone base polymer in the release coating materials of the present subject matter. In many embodiments, the silicone base polymer(s) exhibits a typical viscosity within a range of from about 50 to 1,000 cPs. The silicone base polymer is typically used in the release coating materials of the present subject matter in a range of from about 10% to about 95%. All percentages noted herein are percentages by weight unless noted otherwise.

In many embodiments, the non-silicone additive is an acrylate. The term "acrylate" as used herein includes acrylates, methacrylates and combinations of acrylates and methacrylates. In particular embodiments, the non-silicone additive includes a long chain hydrophobic acrylate monomer(s) such as those selected from the group consisting of stearyl methacrylate (also known as N-octadecyl methacrylate), lauryl methacrylate (dodecyl methacrylate), lauryl acrylate and combinations thereof. In particular embodiments, the non-silicone additive is a monofunctional acrylate/methacrylate that includes a hydrophobic $C_{16}$ to $C_{18}$ side chain.

The non-silicone additive is useful and serves as an accelerator. The non-silicone additive(s) is introduced in or in association with one or more base polymer(s) of a silicone system which maintains release performance of the silicone for release liner applications such as in hot melt pressure sensitive label applications.

In one embodiment of the subject matter, a release coating formulation comprising non-silicone additive is provided wherein the release coating formulation includes a proportionate amount of one or more non-silicone additive(s) and silicone base polymer.

The non-silicone additive may comprise up to about 90% of the total release coating formulation. In many embodiments, the amount of the non-silicone additive is within a range of from about 5% to 90%.

In certain embodiments, the non-silicone additive(s) can replace the silicone base polymer to an extent of from about 10% to 70%.

It has been observed that addition of the non-silicone additive is advantageous as stearyl methacrylate occurs as liquid above 18° C. and thus can be added to a solventless silicone formulation. Also, since stearyl methacrylate is a waxy compound, it has a low surface energy so as to allow low adhesion to an adhesive surface of a pressure sensitive construction. Moreover, stearyl methacrylate participates in hydrosilylation/crosslinking of silicone.

A variety of crosslinking agent(s) can be used in the release coating material(s) of the present subject matter. In many embodiments, the crosslinker is a silicone hydride (SiH) agent, which is typically in the form of a polymer or oligomer.

The crosslinking agent(s) is typically used in a weight proportion based upon the amount of the silicone base polymer. For many embodiments of the present subject matter, the weight ratio of the crosslinker to the silicone base polymer is within a range of from 1.2 to 3.0:1, and in certain embodiments from 1.8 to 2.2:1, respectively. In certain embodiments, the weight proportion of crosslinker (SiH) and the silicone base polymer may be in the range of from about 1.4:1 to about 2.5:1, with a weight proportion of about 1.8:1 useful for many applications.

The formulation of the non-silicone additive may further comprise a catalyst according to an embodiment herein.

The catalyst used may be a platinum (Pt) catalyst. However, the present subject matter includes the use of other catalyst(s). In many embodiments, the platinum catalyst is Karstedt's catalyst, which is an organoplatinum compound derived from divinyl-containing disiloxane. This is a coordination complex and widely used in hydrosylation catalysis.

The catalyst(s) is typically used in an amount based upon the total amount of the release coating material, and typically within a range of from about 10 to 140 ppm and in certain embodiments from 30 to 70 ppm.

Representative release coating materials in accordance with the present subject matter are set forth below in Table 1:

TABLE 1

Representative Release Coating Materials

| Component | Amount % |
|---|---|
| Silicone Base Polymer(s) | 10-95 |
| Non-Silicone Additive(s) | 5-90 |
| Crosslinker(s) | As Noted |
| Catalyst(s) | As Noted |

In many versions of the present subject matter, the release coatings are applied to a release liner substrate at a desired coatweight or thickness and then cured. For particular applications, curing can be performed by heating such as heating to a temperature of from about 80° C. to about 140° C., with 110° C. being suitable for many applications.

Method of Preparation of the Release Coating Material

In an illustrative example of a method of preparation of a release coating material in accordance with the present subject matter, non-silicone additive which is stearyl methacrylate, is added to a silicone base polymer and the solution is mixed for 10 minutes. The crosslinker is added to the solution and mixed vigorously. After 15 minutes, catalyst solution is added drop-wise and mixed for 15 minutes. The mixing procedure is carried out in a laboratory at ambient conditions. The term "ambient conditions" refers to atmospheric pressure, a temperature of 22° C.±3° C. (72° F.±5° F.), and a relative humidity of 50%±10%.

Release Liners

The present subject matter also provides a variety of release liners having one or more regions and/or layers of the release coating materials described herein, coated or otherwise applied to the liner.

In many embodiments, the liner material is a polymeric film, a paper material, and/or a coated paper material. More specifically, various materials can be utilized for the release liner including conventional smooth surface paper materials, polyester films and polyolefin films of the type typically utilized as release liners, such as, for example, kraft paper, glassine paper, polyethylene, polypropylene, polyester and composites thereof. In certain applications, the release liner is sufficiently thick, i.e., on the order of 0.004 inch to 0.0075 inch in thickness or higher, to rigidify a backing sheet prior to use. The release liner is preferably sufficiently rigid and/or thick to typically maintain a flat configuration. However, the release liner can have some flexibility to bend, flex or deform in response to external pressure.

The liner can be a single panel liner or include multiple components or panels to form a liner assembly.

Adhesive Articles

The present subject matter also provides adhesive articles having a layer or region of adhesive that is at least partially covered by the release coating material described herein. In many applications the adhesive article is a label or other substrate having a layer of a pressure sensitive adhesive that is at least partially covered by a release liner with a thin layer of the release coating material disposed along the interface between the adhesive and the release liner. In many embodiments, the substrate of the adhesive article is a polymeric filmic material, a paper material, and/or combinations thereof.

The adhesive layer may be formed from any suitable adhesive material as desired for a particular purpose or intended use. In one embodiment, the adhesive layer comprises a pressure sensitive adhesive layer. In some applications, the adhesive may be a heat activated adhesive, as distinguished from a pressure sensitive adhesive. The pressure sensitive adhesive can be any pressure sensitive adhesive now known in the art or later discovered. These include rubber based adhesives, acrylic adhesives, vinyl ether adhesives, silicone adhesives, and mixtures of two or more thereof. Included are the pressure sensitive adhesive materials described in "Adhesion and Bonding", Encyclopedia of Polymer Science and Engineering, Vol. 1, pages 476-546, Interscience Publishers, 2nd Ed. 1985. The pressure sensitive adhesive materials that are useful may contain as a major constituent an adhesive polymer such as acrylic type polymers, block copolymers, natural, reclaimed or styrene butadiene rubbers, tackified natural or synthetic rubbers, random copolymers of ethylene and vinyl acetate, ethylene-vinyl-acrylic terpolymers, polyisobutylene, poly(vinyl ether), etc. The pressure sensitive adhesive materials are typically characterized by glass transition temperatures in the range of about −70° C. to about 10° C.

Other materials in addition to the foregoing resins may be included in the pressure sensitive adhesive materials. These include solid tackifying resins, liquid tackifiers (often referred to as plasticizers), antioxidants, fillers, pigments, waxes, etc. The adhesive materials may contain a blend of solid tackifying resins and liquid tackifying resins (or liquid plasticizers). Particularly useful adhesives are described in U.S. Pat. Nos. 5,192,612 and 5,346,766.

The adhesive layer may have a thickness as desired for a particular purpose or intended use. In one embodiment, the adhesive layer may have a thickness from about 10 to about 125, or from about 10 to about 75, or from about 10 to about 50 microns. In one embodiment, the coat weight of the pressure sensitive adhesive may be in the range of about 10 to about 50 grams per square meter (gsm), and in one embodiment about 20 to about 35 gsm.

The construction of the adhesive layer is not limited and may be any suitable construction or configuration as desired for a particular purpose or intended use. For example, in one embodiment, the adhesive layer may be a single layer construction. In another embodiment, the adhesive layer may be a multi-layer construction comprising two or more adhesive layers. In one embodiment, the adhesive layer(s) may also be substantially continuous. In another embodiment, the adhesive layer(s) may be provided as a discontinuous layer or layers.

Methods

The present subject matter also provides various methods. In many embodiments, the methods relate to techniques for reducing cost of release coating materials that utilize silicone base polymer(s). The methods involve replacing a portion of the amount of silicone base polymer in the release coating material with at least one non-silicone additive as described herein.

Figure 1:
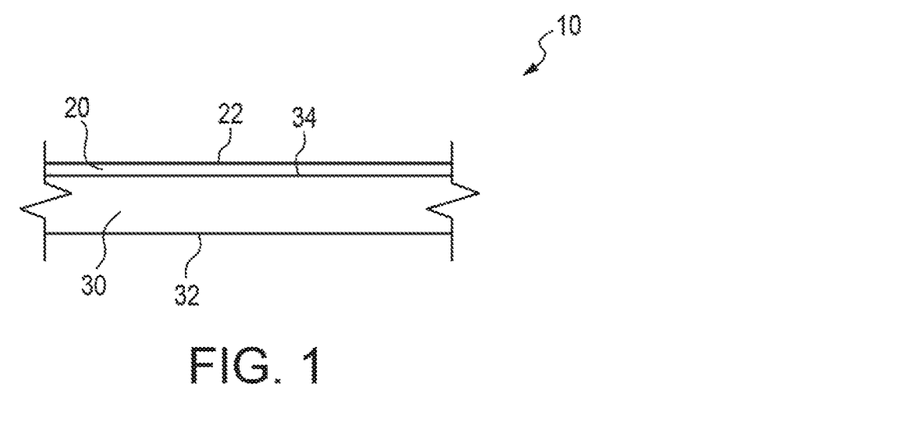
FIG. 1 is a schematic cross sectional illustration of a release liner having a layer of a release coating material in accordance with an embodiment of the present subject matter.

FIG. 1 illustrates a release liner 10 comprising relatively thin substrate 30 defining a first face 34, and a second oppositely directed face 32. The release liner 10 also comprises a layer or region of a release coating material 20 that includes silicone base polymer and one or more non-silicone additive(s) as described herein. The release layer 20 is disposed on a face of the substrate 30 such as the face 34. The present subject matter also includes release layer(s) on the other face 32. The release layer 20 defines an exposed face 22 for contacting adhesive (not shown).

Figure 2:
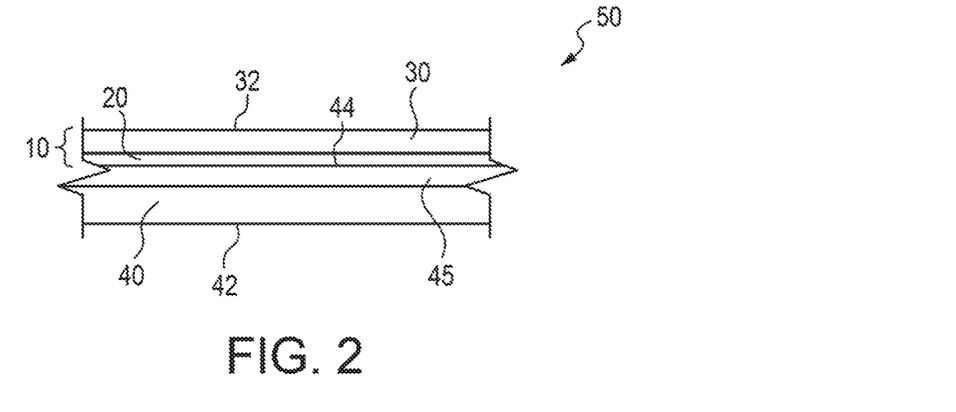
FIG. 2 is a schematic cross sectional illustration of an adhesive article including a layer of a release coating material in accordance with an embodiment of the present subject matter.

FIG. 2 illustrates an adhesive article 50 comprising the previously described release liner 10 disposed on a layer or region of adhesive 45. The adhesive 45 is typically disposed on a substrate 40 such as a label or other article. The layer of adhesive 45 defines an outer face 44 which is at least partially covered by the release liner 10 and specifically, the layer of release coating material 20. The adhesive article 50 may also define an oppositely directed face or region 42.

It will be appreciated that the present subject matter is not limited to the particular embodiments, configurations, and/or arrangements such as shown in FIGS. 1 and 2; and instead includes a wide array of other arrangements.

EXAMPLES

Release coating formulations including non-silicone additive were formulated comprising varying proportion of crosslinker (SiH) and silicone base polymer as previously described. The effectiveness of such formulations was evaluated with regard to their suitability for use as release coating material. The formulations are summarized Table 2 and Table 3.

Silicone: Developed the silicone solution by replacing 50% of silicone polymer with stearyl methacrylate (SM). In Table 2, Samples A, B, and C each utilized 50% replacement of silicone base polymer with the non-silicone additive, which was stearyl methacrylate (SM). Each sample included platinum at a concentration of 60 ppm.

TABLE 2

Release Coating Formulations (60 ppm)

| Abbreviation<br>Wt (%) | SM50/A/60 ppm<br>% | SM50/B/60 ppm<br>% | SM50/C/60 ppm<br>% |
|---|---|---|---|
| Silicone base polymer (vinyl terminated) | 48.36 | 48.32 | 47.6 |
| SM | 48.36 | 48.32 | 47.6 |
| Crosslinker | 2.11 | 2.65 | 3.64 |
| Pt (ppm) | 60 | 60 | 60 |
| Catalyst | 1.17 | 1.17 | 0.17 |

In Table 3, Sample C was further evaluated by reducing the amount of platinum to 40 ppm, and by comparison to a corresponding sample free of the non-silicone additive (SM).

TABLE 3

Release Coating Formulations (40 ppm)

| Abbreviation<br>Wt (%) | SM0/C/40 ppm<br>% | SM50/C/40 ppm<br>% |
|---|---|---|
| Silicone base polymer (vinyl terminated) | 92.37 | 47.82 |
| SM | 0 | 47.82 |
| Crosslinker | 6.85 | 3.58 |
| Pt (ppm) | 40 | 40 |
| Catalyst | 0.77 | 0.77 |

Coatings with such release formulations were carried out on glassine (BG40) paper using a single roll lab coater. The curing which is preferably thermal curing was performed at 110° C. for 3 minutes. The extractable studies are a measure of curing percentage (%). Low extractable values relate to high percentage or extent of curing. Pressure sensitive construction of laminates was made in a laboratory using hot melt adhesive.

TABLE 4

Differential Scanning Calorimetry (DSC) Data (40 ppm Formulation)

| No. | Sample | On Set Curing Temperature (° C.) | ΔH (J/g) |
|---|---|---|---|
| 1 | SM0/C/40 ppm | 123.83 | 43.68 |
| 2 | SM50/C/40 ppm | 90.88 | 28.07 |

TABLE 5

Curing Performance (40 ppm Formulation)

| No. | Sample | Extractable (%) | Durlac (%) |
|---|---|---|---|
| 1 | SM0/C/40 ppm | 14 | 75 |
| 2 | SM50/C/40 ppm | 3.5 | 60 |

In Table 5, curing performance was evaluated at least in part by "Durlac (%)." Durlac refers to the anchorage of the silicone layer to a substrate. Durlac (%) is measured by determining the percentage coat weight remaining on a liner after rubbing against a felt pad.

TABLE 6

Differential Scanning Calorimetry (DSC) Data (60 ppm Formulation)

| Sr. No. | Sample | On Set Curing Temperature (° C.) | ΔH (J/g) |
|---|---|---|---|
| 1 | SM0%/B/60 ppm | 118 | 42.6 |
| 2 | SM50/A/60 ppm | 90.89 | 11.41 |
| 3 | SM50/B/60 ppm | 90.76 | 18.81 |
| 4 | SM50/B/60 ppm | 92.64 | 29.05 |

TABLE 7

Curing and Aging Studies of 60 ppm Formulation on Glassine Paper

| Abr | Extractable (%) | 7 Days | 14 Days | 30 Days | 7 Days at 60° C. | 14 Days at 60° C. | 30 Days at 60° C. | 7 Days @ 65° C./80RH |
|---|---|---|---|---|---|---|---|---|
| SM50/A/60 ppm | 7 | 9.95 | 10.78 | 11.86 | 10.15 | 9.53 | 9.92 | 10.74 |
| SM50/C/60 ppm | 0 | 8.13 | 11.41 | 10.38 | 9.9 | 11.54 | 10.45 | 9.15 |
| SM50/B/60 ppm | 4.5 | 9.75 | 12.26 | 12.20 | 13.87 | 11.86 | 9.4 | 9.75 |

It can be readily observed from Table 4 that the onset of curing temperature significantly decreased after addition of a non-silicone additive such as stearyl methacrylate in a silicone formulation (No. 2). It can be concluded that addition of stearyl methacrylate in the silicone formulation renders the formulation sufficiently reactive. Furthermore, the reactivity of the silicone formulation by adding stearyl methacrylate was validated by curing performance on glassine liner. Extractable studies clearly indicated that a formulation with stearyl methacrylate is reactive even at 40 ppm compared to formulation without stearyl methacrylate. The aging studies revealed that addition of additive did not cause significant effect on release (Table 7). This finding confirmed that a non-silicone additive such as stearyl methacrylate can be used for formulating a release coating for hot melt pressure sensitive adhesive application and thus reduction in cost of release material(s) is achievable.

Additional Aspects

Although in many embodiments, the release coating materials include platinum catalyst(s), the present subject matter also includes release coating materials that comprise the silicone base polymer(s) and the non-silicone additive(s), which are free of platinum catalyst(s). Such materials are referred to herein as "platinum-free." It is contemplated that such materials could be cured by exposure to radiation or utilize a different catalyst such as for example a rhodium catalyst.

Many other benefits will no doubt become apparent from future application and development of this technology.

All patents, applications, standards, and articles noted herein are hereby incorporated by reference in their entirety.

The present subject matter includes all operable combinations of features and aspects described herein. Thus, for example if one feature is described in association with an embodiment and another feature is described in association with another embodiment, it will be understood that the present subject matter includes embodiments having a combination of these features.

The following embodiments are contemplated. All combinations of features and embodiments are contemplated.

Embodiment 1 a release coating material comprising at least one silicone base polymer and at least one non-silicone additive.

Embodiment 2 the embodiment of embodiment 1 wherein the silicone base polymer is a vinyl functional polydimethylsiloxane.

Embodiment 3 the embodiment of embodiments 1-2 wherein the silicone base polymer is vinyl terminated.

Embodiment 4 the embodiment of embodiments 1-3 wherein the silicone base polymer exhibits a viscosity within a range of from 50 cPs to 1,000 cPs.

Embodiment 5 the embodiment of embodiments 1-5 wherein the silicone base polymer constitutes from 10% to 95% of the release coating material.

Embodiment 6 the embodiment of embodiments 1-5 wherein the non-silicone additive is an acrylate.

Embodiment 7 the embodiment of embodiments 1-6 wherein the non-silicone additive is a long chain hydrophobic acrylate monomer.

Embodiment 8 the embodiment of embodiments 1-7 wherein the non-silicone additive is selected from the group consisting of stearyl methacrylate, lauryl methacrylate, lauryl acrylate, and combinations thereof.

Embodiment 9 the embodiment of embodiments 1-8 wherein the acrylate non-silicone additive is a monofunctional acrylate that includes a hydrophobic $C_{16}$ to $C_{18}$ side chain.

Embodiment 10 the embodiment of embodiments 1-9 wherein the non-silicone additive constitutes from 5% to 90% of the release coating material.

Embodiment 11 the embodiment of embodiments 1-10 further comprising at least one crosslinking agent.

Embodiment 12 the embodiment of embodiment 11 wherein the crosslinking agent is a silicone hydride agent.

Embodiment 13 the embodiment of embodiment 12 wherein the weight ratio of the silicone hydride agent to the silicone base polymer is within a range of from 1.2:1 to 3.0:1.

Embodiment 14 the embodiment of embodiment 13 wherein the weight ratio is within a range of from 1.8:1 to 2.2:1.

Embodiment 15 the embodiment of embodiments 1-14 further comprising at least one catalyst.

Embodiment 16 the embodiment of embodiment 15 wherein the catalyst is a platinum catalyst.

Embodiment 17 the embodiment of embodiment 16 wherein the platinum catalyst is Karstedt's catalyst.

Embodiment 18 the embodiment of embodiments 16-17 wherein the amount of the platinum catalyst is within a range of from 10 ppm to 140 ppm.

Embodiment 19 the embodiment of embodiment 18 wherein the amount of the platinum catalyst is within a range of from 30 ppm to 70 ppm.

Embodiment 20 a release liner comprising a flexible liner defining a first face and an oppositely directed second face; and a release coating material disposed on at least a portion of the first face of the liner, the release coating material including at least one silicone base polymer and at least one non-silicone additive.

Embodiment 21 the embodiment of embodiment 20 wherein the silicone base polymer is a vinyl functional polydimethylsiloxane.

Embodiment 22 the embodiment of embodiments claims 20-21 wherein the silicone base polymer is vinyl terminated.

Embodiment 23 the embodiment of embodiments 20-22 wherein the silicone base polymer exhibits a viscosity within a range of from 50 cPs to 1,000 cPs.

Embodiment 24 the embodiment of embodiments 20-23 wherein the silicone base polymer constitutes from 10% to 95% of the release coating material.

Embodiment 25 the embodiment of embodiments 20-24 wherein the non-silicone additive is an acrylate.

Embodiment 26 the embodiment of embodiments 20-25 wherein the non-silicone additive is a long chain hydrophobic acrylate monomer.

Embodiment 27 the embodiment of embodiments 20-26 wherein the non-silicone additive is selected from the group consisting of stearyl methacrylate, lauryl methacrylate, lauryl acrylate, and combinations thereof.

Embodiment 28 the embodiment of embodiments 20-27 wherein the non-silicone additive is a monofunctional acrylate that includes a hydrophobic $C_{16}$ to $C_{18}$ side chain.

Embodiment 29 the embodiment of embodiments 20-28 wherein the non-silicone additive constitutes from 5% to 90% of the release coating material.

Embodiment 30 the embodiment of embodiments 20-29 further comprising at least one crosslinking agent.

Embodiment 31 the embodiment of embodiment 30 wherein the crosslinking agent is a silicone hydride agent.

Embodiment 32 the embodiment of embodiment 31 wherein the weight ratio of the silicone hydride agent to the silicone base polymer is within a range of from 1.2:1 to 3.0:1.

Embodiment 33 the embodiment of embodiment 32 wherein the weight ratio is within a range of from 1.8:1 to 2.2:1.

Embodiment 34 the embodiment of embodiments 20-33 wherein the release coating material further includes at least one catalyst.

Embodiment 35 the embodiment of embodiment 34 wherein the catalyst is a platinum catalyst.

Embodiment 36 the embodiment of embodiment 35 wherein the platinum catalyst is Karstedt's catalyst.

Embodiment 37 the embodiment of embodiments 35-36 wherein the amount of the platinum catalyst is within a range of from 10 ppm to 140 ppm.

Embodiment 38 the embodiment of embodiment 37 wherein the amount of the platinum catalyst is within a range of from 30 ppm to 70 ppm.

Embodiment 39 the embodiment of embodiments 20-38 wherein the liner is selected from the group consisting of filmic liners, paper liners, and coated paper liners.

Embodiment 40 a method of reducing cost of a release coating material including at least one silicone base polymer, the method comprising replacing a portion of the amount of silicone base polymer in the release coating material with at least one non-silicone additive.

Embodiment 41 the embodiment of embodiment 40 wherein the silicone base polymer is a vinyl functional polydimethylsiloxane.

Embodiment 42 the embodiment of embodiments 40-41 wherein the silicone base polymer is vinyl terminated.

Embodiment 43 the embodiment of embodiments 40-42 wherein the silicone base polymer exhibits a viscosity within a range of from 50 cPs to 1,000 cPs.

Embodiment 44 the embodiment of embodiments 40-43 wherein the silicone base polymer constitutes from 10% to 95% of the release coating material after the replacing.

Embodiment 45 the embodiment of embodiments 40-44 wherein the non-silicone additive is an acrylate.

Embodiment 46 the embodiment of embodiments 40-45 wherein the non-silicone additive is a long chain hydrophobic acrylate monomer.

Embodiment 47 the embodiment of embodiments 40-46 wherein the non-silicone additive is selected from the group consisting of stearyl methacrylate, lauryl methacrylate, lauryl acrylate, and combinations thereof.

Embodiment 48 the embodiment of embodiments 40-47 wherein the non-silicone additive is a monofunctional acrylate that includes a hydrophobic $C_{16}$ to $C_{18}$ side chain.

Embodiment 49 the embodiment of embodiments 40-48 wherein the non-silicone additive constitutes from 5% to 90% of the release coating material after the replacing.

Embodiment 50 the embodiment of embodiments 40-49 further comprising at least one crosslinking agent.

Embodiment 51 the embodiment of embodiment 50 wherein the crosslinking agent is a silicone hydride agent.

Embodiment 52 the embodiment of embodiment 51 wherein the weight ratio of the silicone hydride agent to the silicone base polymer is within a range of from 1.2:1 to 3.0:1.

Embodiment 53 the embodiment of embodiment 52 wherein the weight ratio is within a range of from 1.8:1 to 2.2:1.

Embodiment 54 the embodiment of embodiments 40-53 wherein the release coating material further includes at least one catalyst.

Embodiment 55 the embodiment of embodiment 54 wherein the catalyst is a platinum catalyst.

Embodiment 56 the embodiment of embodiment 55 wherein the platinum catalyst is Karstedt's catalyst.

Embodiment 57 the embodiment of embodiments 55-56 wherein the amount of the platinum catalyst is within a range of from 10 ppm to 140 ppm.

Embodiment 58 the embodiment of embodiment 57 wherein the amount of the platinum catalyst is within a range of from 30 ppm to 70 ppm.

Embodiment 59 the embodiment of embodiments 40-58 wherein the replacing is performed such that from 10% to 70% of the silicone base polymer is replaced with the at least one non-silicone additive.

Embodiment 60 an adhesive article comprising a substrate; adhesive disposed on the substrate; a release liner having a release coating material disposed on at least a portion of the liner, the release coating material of the liner disposed on the adhesive, the release coating material including at least one silicone base polymer and at least one non-silicone additive.

Embodiment 61 the embodiment of embodiment 60 wherein the silicone base polymer is a vinyl functional polydimethylsiloxane.

Embodiment 62 the embodiment of embodiments 60-61 wherein the silicone base polymer is vinyl terminated.

Embodiment 63 the embodiment of embodiments 60-62 wherein the silicone base polymer exhibits a viscosity within a range of from 50 cPs to 1,000 cPs.

Embodiment 64 the embodiment of embodiments 60-63 wherein the silicone base polymer constitutes from 10% to 95% of the release coating material.

Embodiment 65 the embodiment of embodiments 60-64 wherein the non-silicone additive is an acrylate.

Embodiment 66 the embodiment of embodiments 60-65 wherein the non-silicone additive is a long chain hydrophobic acrylate monomer.

Embodiment 67 the embodiment of embodiments 60-66 wherein the non-silicone additive is selected from the group consisting of stearyl methacrylate, lauryl methacrylate, lauryl acrylate, and combinations thereof.

Embodiment 68 the embodiment of embodiments 60-67 wherein the acrylate non-silicone additive is a monofunctional acrylate that includes a hydrophobic $C_{16}$ to $C_{18}$ side chain.

Embodiment 69 the embodiment of embodiments 60-68 wherein the non-silicone additive constitutes from 5% to 90% of the release coating material.

Embodiment 70 the embodiment of embodiments 60-69 further comprising at least one crosslinking agent.

Embodiment 71 the embodiment of embodiment 70 wherein the crosslinking agent is a silicone hydride agent.

Embodiment 72 the embodiment of embodiment 71 wherein the weight ratio of the silicone hydride agent to the silicone base polymer is within a range of from 1.2:1 to 3.0:1.

Embodiment 73 the embodiment of embodiment 72 wherein the weight ratio is within a range of from 1.8:1 to 2.2:1.

Embodiment 74 the embodiment of embodiments 60-73 wherein the release coating material further includes at least one catalyst.

Embodiment 75 the embodiment of embodiment 74 wherein the catalyst is a platinum catalyst.

Embodiment 76 the embodiment of embodiment 75 wherein the platinum catalyst is Karstedt's catalyst.

Embodiment 77 the embodiment of embodiments 75-76 wherein the amount of the platinum catalyst is within a range of from 10 ppm to 140 ppm.

Embodiment 78 the embodiment of embodiment 77 wherein the amount of the platinum catalyst is within a range of from 30 ppm to 70 ppm.

Embodiment 79 the embodiment of embodiments 60-78 wherein the substrate is selected from the group consisting of filmic substrates, paper substrates, and combinations thereof.

Embodiment 80 the embodiment of embodiments 60-79 wherein the adhesive is a pressure sensitive adhesive.

Embodiment 81 the embodiment of embodiments 60-80 wherein the liner is selected from the group consisting of filmic liners, paper liners, and coated paper liners.

Embodiment 82 the embodiment of embodiments 1-7 wherein the non-silicone additive is stearyl methacrylate.

Embodiment 83 the embodiment of embodiments 20-26 wherein the non-silicone additive is stearyl methacrylate.

Embodiment 84 the embodiment of embodiments 40-46 wherein the non-silicone additive is stearyl methacrylate.

Embodiment 84 the embodiment of embodiments 60-66 wherein the non-silicone additive is stearyl methacrylate.

As described hereinabove, the present subject matter solves many problems associated with previous strategies, systems and/or devices. However, it will be appreciated that various changes in the details, materials and arrangements of components, which have been herein described and illustrated in order to explain the nature of the present subject matter, may be made by those skilled in the art without departing from the principle and scope of the claimed subject matter, as expressed in the appended claims.

What is claimed is:

1. A release coating material comprising:
    at least one silicone base polymer, wherein the silicone base polymer is a vinyl functional polydimethylsiloxane;
    at least one non-silicone additive, wherein the non-silicone additive is a hydrophobic acrylate monomer.

2. The release coating of claim 1 wherein the silicone base polymer is vinyl terminated.

3. The release coating of claim 1 wherein the silicone base polymer constitutes from 10% to 95% of the release coating material.

4. The release coating of claim 1 wherein the non-silicone additive is selected from the group consisting of stearyl methacrylate, lauryl methacrylate, lauryl acrylate, and combinations thereof.

5. The release coating of claim 1 wherein the non-silicone additive is stearyl methacrylate.

6. The release coating of claim 1 wherein the non-silicone additive constitutes from 5% to 90% of the release coating material.

7. The release coating of claim 1 further comprising:
    at least one crosslinking agent.

8. The release coating of claim 7 wherein the crosslinking agent is a silicone hydride agent.

9. The release coating of claim 8 wherein the weight ratio of the silicone hydride agent to the silicone base polymer is within a range of from 1.2:1 to 3.0:1.

10. The release coating of claim 1 further comprising:
    at least one catalyst.

11. The release coating of claim 10 wherein the catalyst is a platinum catalyst.

12. The release coating of claim 11 wherein the amount of the platinum catalyst is within a range of from 10 ppm to 140 ppm.

13. A release liner comprising:
    a flexible liner defining a first face and an oppositely directed second face; and
    a release coating material disposed on at least a portion of the first face of the liner, the release coating material including at least one silicone base polymer and at least one non-silicone additive, wherein the silicone base polymer is a vinyl functional polydimethylsiloxane, and wherein the non-silicone additive is an acrylate monomer.

14. The release liner of claim 13 wherein the silicone base polymer is vinyl terminated.

15. The release liner of claim 13 wherein the silicone base polymer constitutes from 10% to 95% of the release coating material.

16. The release liner of claim 13 wherein the non-silicone additive is selected from the group consisting of stearyl methacrylate, lauryl methacrylate, lauryl acrylate, and combinations thereof.

17. The release liner of claim 13 wherein the non-silicone additive is stearyl methacrylate.

18. The release liner of claim 13 wherein the non-silicone additive constitutes from 5% to 90% of the release coating material.

19. The release liner of claim 13 further comprising:
    at least one crosslinking agent.

20. The release liner of claim 19 wherein the crosslinking agent is a silicone hydride agent.

21. The release liner of claim 20 wherein the weight ratio of the silicone hydride agent to the silicone base polymer is within a range of from 1.2:1 to 3.0:1.

22. The release liner of claim 13 wherein the release coating material further includes at least one catalyst.

23. The release liner of claim 22 wherein the catalyst is a platinum catalyst.

24. The release liner of claim 23 wherein the amount of the platinum catalyst is within a range of from 10 ppm to 140 ppm.

25. The release liner of claim 13 wherein the liner is selected from the group consisting of filmic liners, paper liners, and coated paper liners.

26. An adhesive article comprising:
a substrate;
adhesive disposed on the substrate;
a release liner having a release coating material disposed on at least a portion of the liner, the release coating material of the liner disposed on the adhesive, the release coating material including at least one silicone base polymer and at least one non-silicone additive, wherein the silicone base polymer is vinyl functional polydimethylsiloxane, and wherein the non-silicone additive is an acrylate monomer.

27. The adhesive article of claim 26 wherein the silicone base polymer constitutes from 10% to 95% of the release coating material.

28. The adhesive article of claim 26 wherein the non-silicone additive is selected from the group consisting of stearyl methacrylate, lauryl methacrylate, lauryl acrylate, and combinations thereof.

29. The adhesive article of claim 26 wherein the non-silicone additive is stearyl methacrylate.

30. The adhesive article of claim 26 wherein the non-silicone additive constitutes from 5% to 90% of the release coating material.

31. The adhesive article of claim 26 further comprising:
at least one crosslinking agent.

32. The adhesive article of claim 31 wherein the crosslinking agent is a silicone hydride agent.

33. The adhesive article of claim 26 wherein the release coating material further includes at least one catalyst.

34. The adhesive article of claim 33 wherein the catalyst is a platinum catalyst.

35. The adhesive article of claim 26 wherein the substrate is selected from the group consisting of filmic substrates, paper substrates, and combinations thereof.

36. The adhesive article of claim 26 wherein the adhesive is a pressure sensitive adhesive.

37. The adhesive article of claim 26 wherein the liner is selected from the group consisting of filmic liners, paper liners, and coated paper liners.

* * * * *